United States Patent
Velderman et al.

(10) Patent No.: US 10,500,713 B2
(45) Date of Patent: Dec. 10, 2019

(54) WALL HANGING SYSTEM

(71) Applicant: BLACK & DECKER INC., New Britain, CT (US)

(72) Inventors: Matthew J. Velderman, Baltimore, MD (US); Daniel J. White, Baltimore, MD (US); Gregg L. Sheddy, Shrewsbury, PA (US); Michael P. Kunz, Hampstead, MD (US); Eric Scherbarth, Nottingham, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/974,231

(22) Filed: May 8, 2018

(65) Prior Publication Data

US 2019/0077006 A1    Mar. 14, 2019

Related U.S. Application Data

(60) Provisional application No. 62/558,590, filed on Sep. 14, 2017.

(51) Int. Cl.
*B25H 3/04* (2006.01)
*A47F 5/08* (2006.01)
(Continued)

(52) U.S. Cl.
CPC ............ *B25H 3/04* (2013.01); *A47F 5/0823* (2013.01); *A47F 5/0838* (2013.01);
(Continued)

(58) Field of Classification Search
CPC . B25H 3/04; B25H 3/006; B25H 3/06; B25H 3/00; A47F 5/0823; A47F 5/0838;
(Continued)

(56) References Cited

U.S. PATENT DOCUMENTS 3,081,056 A * 3/1963 Sweet ...................... B25H 3/04
                                                    211/70.6
3,269,550 A * 8/1966 Marcus .................... B25H 3/04
                                                    211/70.6

(Continued)

FOREIGN PATENT DOCUMENTS

EP         2873495 B1    10/2017
JP         2004255503     9/2004
(Continued)

OTHER PUBLICATIONS

EP ESSR, dated Dec. 2, 2019 in corresponding application No. 18193524.8-1019.
(Continued)

*Primary Examiner* — Jennifer E. Novosad
(74) *Attorney, Agent, or Firm* — Stephen R. Valancius

(57) ABSTRACT

A tool hanging system including a first tool having a first mount receiving portion and a second tool having a second mount receiving portion. A first mounting attachment is engaged with the first mount receiving portion and a second mounting attachment engaged with the second mount receiving portion. The tool hanging system further includes a wall panel. The first mounting attachment can hang on the wall panel so that the first tool is hung on the wall panel and the second mounting attachment can hang on the wall panel so that the second tool is hung on the wall panel.

17 Claims, 14 Drawing Sheets

(51) Int. Cl.
*B24B 23/00* (2006.01)
*B25F 5/02* (2006.01)
*B23B 45/00* (2006.01)
*B25H 3/00* (2006.01)

(52) U.S. Cl.
CPC .......... *B23B 45/001* (2013.01); *B24B 23/005* (2013.01); *B25F 5/02* (2013.01); *B25H 3/00* (2013.01)

(58) Field of Classification Search
CPC .... A47F 5/0846; A47F 5/0853; A47F 5/0006; A47F 5/08; A47F 5/0807; A47F 5/0876; A47F 5/083; A47F 5/0869; A47F 7/143; B23B 45/001; B24B 23/005; B25F 5/02; A47B 95/008; A47B 96/067; A47G 25/0614
USPC ......... 211/26, 70.6, 94.01, 57.1, 59.1, 87.01, 211/118, 119.009, 119.004; 248/224.41, 248/224.51, 224.61, 220.21, 220.31, 248/220.32; 206/73
See application file for complete search history.

(56) References Cited

U.S. PATENT DOCUMENTS

| | | | | |
|---|---|---|---|---|
| 3,737,131 A * | 6/1973 | Larson | .................. | A47F 5/0823 211/70.6 |
| 3,915,308 A * | 10/1975 | Ratzloff | .................... | A47F 5/08 211/70.6 |
| 3,980,217 A * | 9/1976 | Yochum | .................. | B60R 11/06 224/489 |
| 3,985,324 A * | 10/1976 | Larson | .................. | A47F 5/0823 248/220.42 |
| 4,155,459 A * | 5/1979 | Marschak | ............. | A47F 5/0823 211/49.1 |
| 4,209,098 A * | 6/1980 | Adams | .................. | A01K 97/08 211/70.8 |
| 4,406,064 A | 9/1983 | Goss | | |
| 4,509,648 A * | 4/1985 | Govang | ................ | A47F 5/0846 211/59.1 |
| 4,603,715 A | 8/1986 | Muelhauser | | |
| 4,664,306 A | 5/1987 | Levy | | |
| 4,723,663 A * | 2/1988 | Learn | .................... | A47F 5/0823 211/59.2 |
| 4,869,378 A * | 9/1989 | Miller | .................. | A47F 5/0853 211/94.01 |
| 5,054,672 A * | 10/1991 | Weissman | ............... | A45F 5/02 211/89.01 |
| 5,071,012 A * | 12/1991 | Jailor | .................... | A47L 9/0009 15/323 |
| 5,180,089 A * | 1/1993 | Suman | .................... | B60N 3/00 224/547 |
| 5,224,609 A * | 7/1993 | Bauer | .................. | A47F 5/0838 211/65 |
| 5,379,976 A * | 1/1995 | DeGirolamo | ......... | A47F 5/0815 248/220.43 |
| 5,513,758 A * | 5/1996 | Lin | ........................ | A47F 5/0846 211/70.6 |
| 5,687,856 A * | 11/1997 | Kendrena | ............. | A47F 5/0846 211/65 |
| 5,740,927 A * | 4/1998 | Yemini | ................ | A47B 96/067 211/66 |
| 5,743,416 A * | 4/1998 | Yemini | .................... | B25H 3/04 211/70.6 |
| 5,775,521 A * | 7/1998 | Tisbo | .................... | A47B 17/033 211/11 |
| 5,956,799 A | 9/1999 | Panaccione et al. | | |
| 5,957,421 A | 9/1999 | Barbour | | |
| 5,988,408 A * | 11/1999 | Evans | .................... | B25H 3/04 211/60.1 |
| 6,305,557 B1 * | 10/2001 | Brooks | .................... | B25H 3/04 211/70.6 |
| 6,364,141 B1 * | 4/2002 | Ehrgott | ................ | A47F 5/0823 211/103 |
| 6,435,357 B1 * | 8/2002 | Lee | ........................ | A47F 5/0838 211/70.6 |
| 6,481,583 B1 * | 11/2002 | Black | .................... | A47F 5/0815 211/70.6 |
| 6,499,608 B1 * | 12/2002 | Sterling | ............... | A47B 96/027 211/70.1 |
| 6,520,357 B1 * | 2/2003 | Kautz | .................... | A47B 96/061 211/151 |
| 6,543,627 B1 * | 4/2003 | Schiavo | ................ | A47B 96/025 211/26 |
| 6,554,342 B1 * | 4/2003 | Burnett | .................... | B60P 3/14 211/70.6 |
| 6,561,474 B1 * | 5/2003 | Walter | .................. | A47F 5/0815 211/94.01 |
| 6,564,949 B1 * | 5/2003 | Saathoff | .................. | B25H 3/006 211/70.6 |
| 6,581,788 B1 * | 6/2003 | Winig | .................. | A47B 96/027 211/183 |
| 6,637,117 B2 | 10/2003 | Kobayashi | | |
| 6,681,940 B1 * | 1/2004 | Cash | ........................ | B25H 3/04 211/70.6 |
| 6,729,485 B2 * | 5/2004 | Ehrgott | ................ | A47F 5/0823 211/189 |
| 6,892,914 B2 * | 5/2005 | Girbert | .................... | A45F 3/14 224/625 |
| 7,090,174 B2 * | 8/2006 | Korczak | ............... | F16B 21/075 248/58 |
| 7,152,748 B2 * | 12/2006 | Vosbikian | ................ | A47F 5/01 211/87.01 |
| D567,615 S | 4/2008 | Taniguchi et al. | | |
| 7,513,361 B1 * | 4/2009 | Mills, Jr. | ................ | A45D 44/00 132/315 |
| D610,421 S | 2/2010 | Taniguchi et al. | | |
| 7,802,680 B2 * | 9/2010 | Krebs | ........................ | B25H 3/04 206/349 |
| 7,861,623 B2 | 1/2011 | Miyazawa et al. | | |
| 8,066,130 B2 * | 11/2011 | Shaha | .................. | A47B 96/067 211/106.01 |
| 8,070,378 B2 * | 12/2011 | Gargaro, III | .......... | A01K 97/10 403/381 |
| 8,443,913 B2 | 5/2013 | Nagasaka et al. | | |
| 8,474,632 B2 * | 7/2013 | Yang | ...................... | A47K 3/281 211/119.009 |
| 8,528,871 B2 * | 9/2013 | Begic | .................. | A47B 96/067 211/86.01 |
| 8,573,415 B2 * | 11/2013 | Ernst | .................... | A47B 96/067 211/183 |
| 8,596,473 B2 * | 12/2013 | Newbould | ........... | A47B 96/067 211/88.01 |
| 8,950,077 B2 | 2/2015 | Quimby et al. | | |
| 9,101,189 B2 * | 8/2015 | Vuckov | ................ | A45C 11/00 |
| 9,247,810 B2 * | 2/2016 | Metzler | ................ | A47B 57/045 |
| 9,630,312 B2 * | 4/2017 | Grela | .................... | A47B 31/00 |
| 9,656,398 B2 | 5/2017 | Wang | | |
| 9,701,008 B2 | 7/2017 | Cho | | |
| 9,884,593 B2 * | 2/2018 | Hull | ........................ | B60R 7/14 |
| 2002/0096545 A1 | 7/2002 | Chang | | |
| 2003/0010734 A1 * | 1/2003 | Bermes | .................. | B25H 3/006 211/70.6 |
| 2005/0247653 A1 * | 11/2005 | Brooks | .................. | A47F 5/0846 211/94.01 |
| 2006/0104735 A1 | 5/2006 | Zeiler et al. | | |
| 2007/0012636 A1 * | 1/2007 | Wisnoski | ............... | A47F 5/0846 211/70.6 |
| 2007/0175843 A1 * | 8/2007 | Kanasashi | ................ | A47F 1/12 211/94.01 |
| 2008/0000853 A1 * | 1/2008 | Huang | .................. | A47F 7/0028 211/70.6 |
| 2009/0026155 A1 * | 1/2009 | Bernard | .................. | B25H 3/006 211/70.6 |
| 2009/0146032 A1 * | 6/2009 | Bettenhausen | ........ | A61B 50/34 248/220.31 |
| 2011/0114580 A1 * | 5/2011 | Chen | ........................ | B25H 3/04 211/70.6 |

(56) References Cited

U.S. PATENT DOCUMENTS

| | | | |
|---|---|---|---|
| 2011/0192810 A1* | 8/2011 | Kao | B25H 3/028 |
| | | | 211/70.6 |
| 2013/0038087 A1* | 2/2013 | Woodard, Jr. | B62D 25/2054 |
| | | | 296/182.1 |
| 2014/0097217 A1 | 4/2014 | Walsh | |
| 2015/0151415 A1 | 6/2015 | Saitou et al. | |
| 2016/0185000 A1 | 6/2016 | Huang | |
| 2017/0259422 A1 | 9/2017 | Takeyama et al. | |

FOREIGN PATENT DOCUMENTS

| | | |
|---|---|---|
| JP | 2010201512 | 9/2010 |
| JP | 2016203326 | 12/2016 |
| WO | 16106183 A1 | 6/2016 |
| WO | 16177795 A1 | 11/2016 |

OTHER PUBLICATIONS

Prior Art, Brushless Cordless Compact Drill/Driver DW732, with belt hook.
Prior Art, Brushless Cordless Compact Drill/Driver DW732B, without belt hook.
Prior Art, Cordless Compact Drill/Driver DW780, with belt hook.
Prior Art, Cordless Compact Drill/Driver DW780B, without belt hook.
Prior Art, Cordless Impact Wrench DCF885, with belt hook.
Prior Art, Cordless Impact Wrench DCF885B, without belt hook.
DeWalt Manual and drawing for Brushless Cordless Compact Drill/Driver DW732; accessed from http://service.dewalt.co.uk//PDMSDocuments/EU/Docs//docpdf/dcd732-dcd737-dcd790-dcd795-typ1_eur.pdf; http://service.dewalt.co.uk/Dewalt/GB/en-GB/Document/DrawingFullPage?documentId=40527&productId=9610.
DeWalt Manual and drawing for Cordless Compact Drill/Driver DW780; accessed from http://service.dewalt.co.uk//PDMSDocuments/EU/Docs/docpdf/dcd730-735-780-785_eur.pdfhttp://service.dewalt.co.uk/Dewalt/GB/en-GB/Document/DrawingFullPage?documentId=32694&productId=8839.
DeWalt Manual for Cordless Impact Driver DCF885; accessed from https://servicenet.dewalt.com/Parts/Search?searchedNumber=DCF883&searchType=1.

* cited by examiner

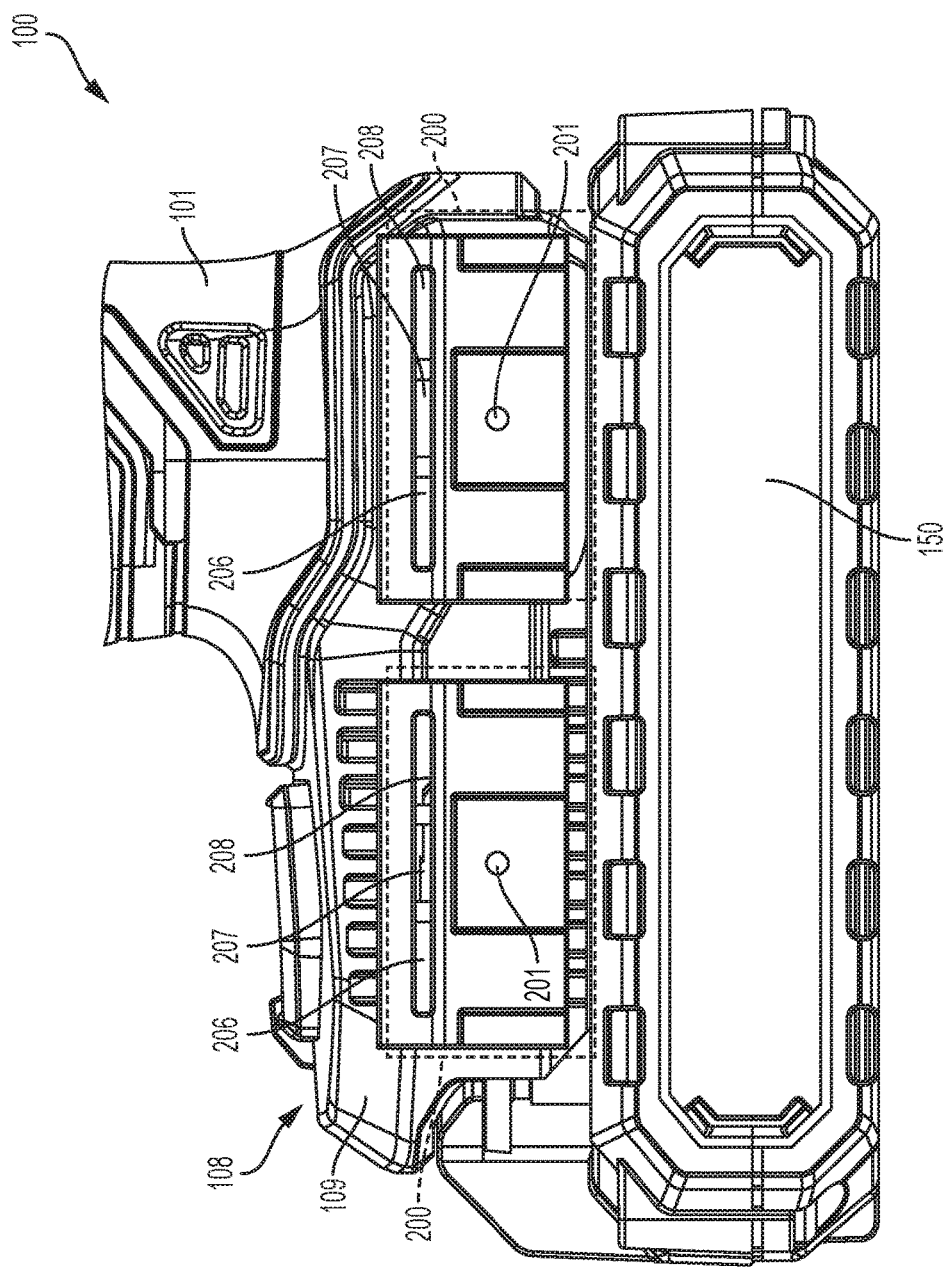

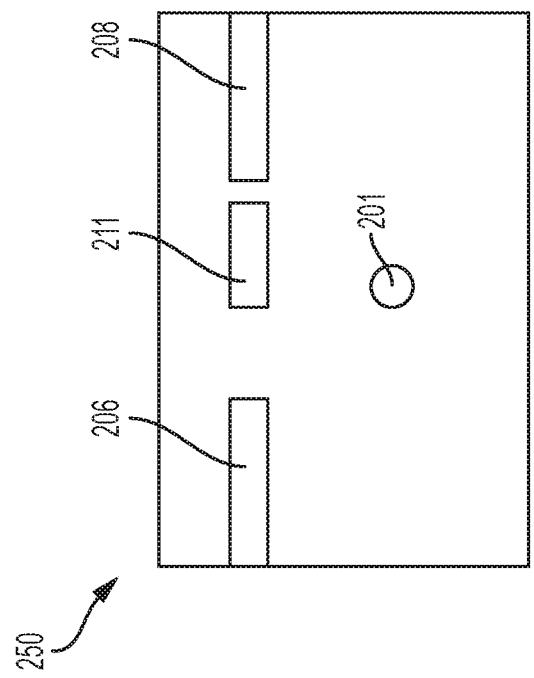
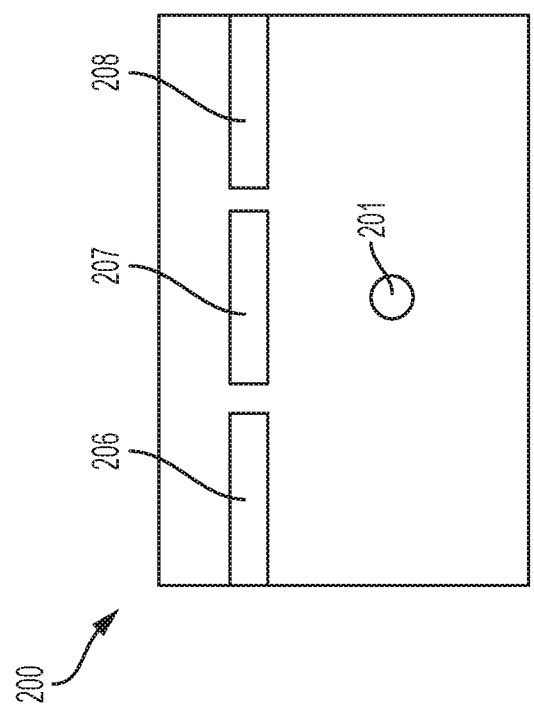

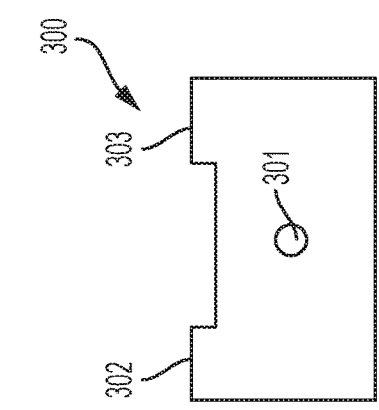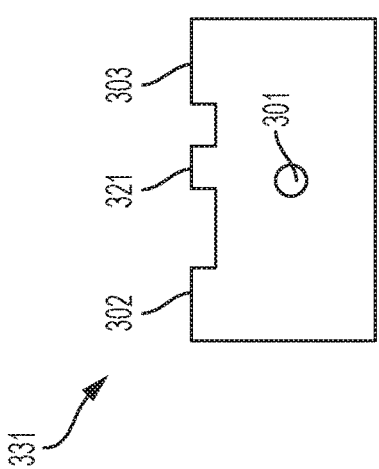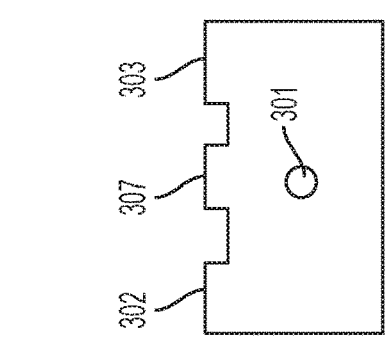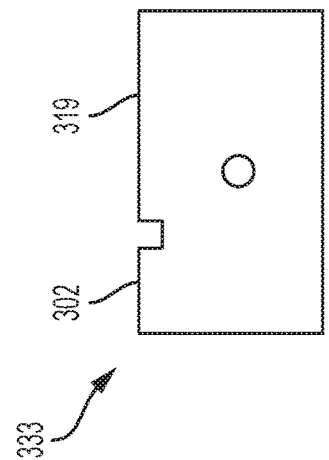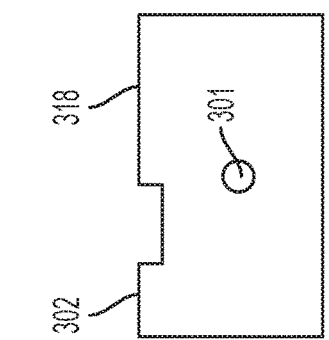

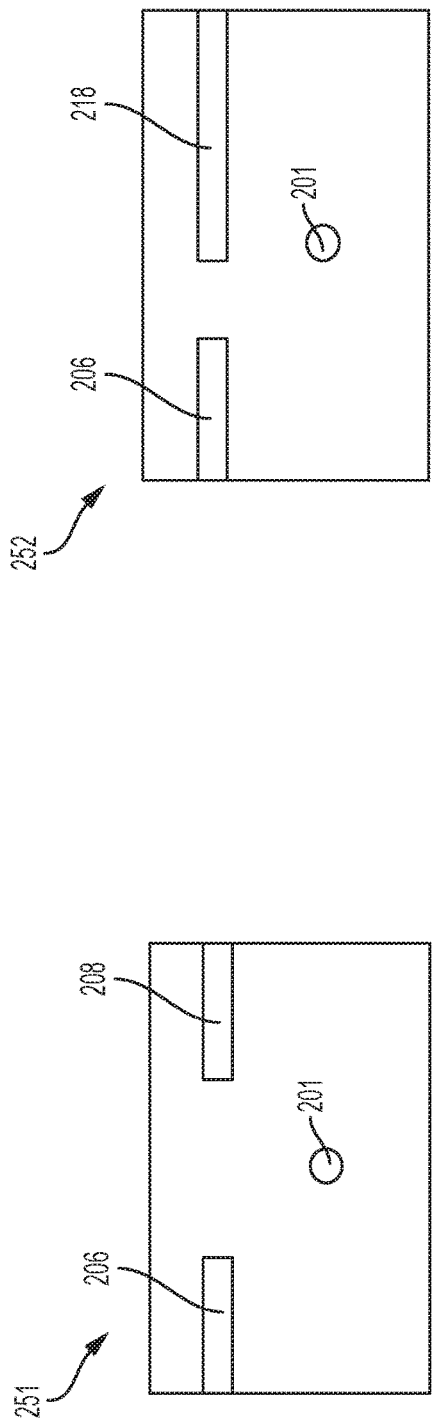
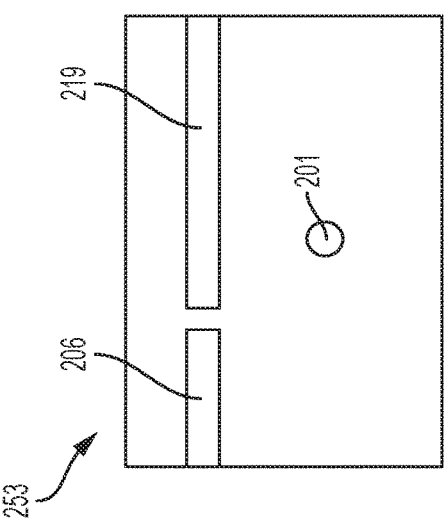

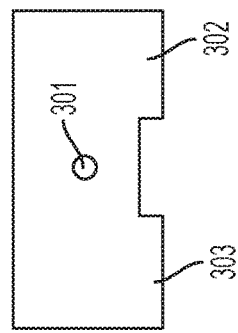
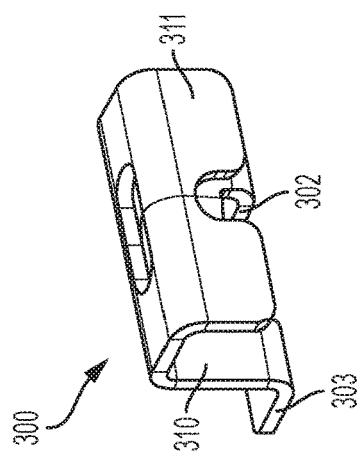
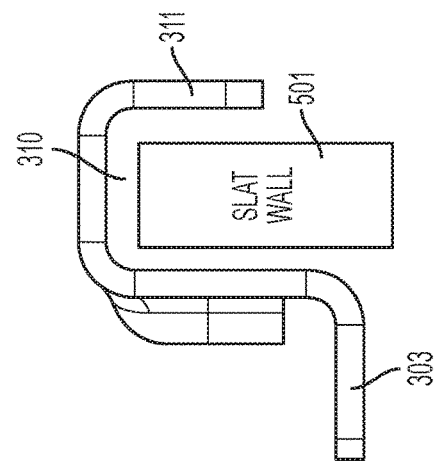
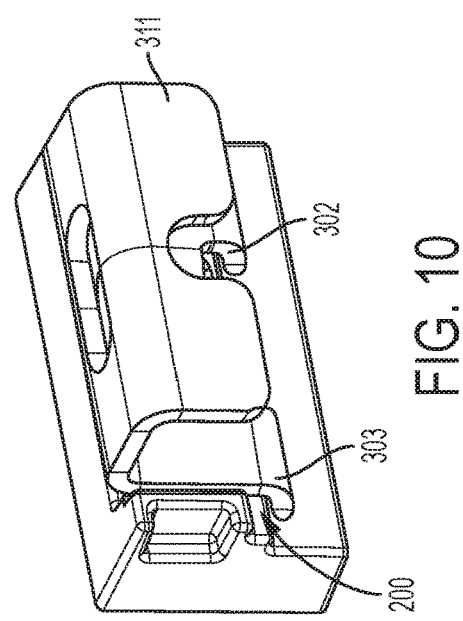

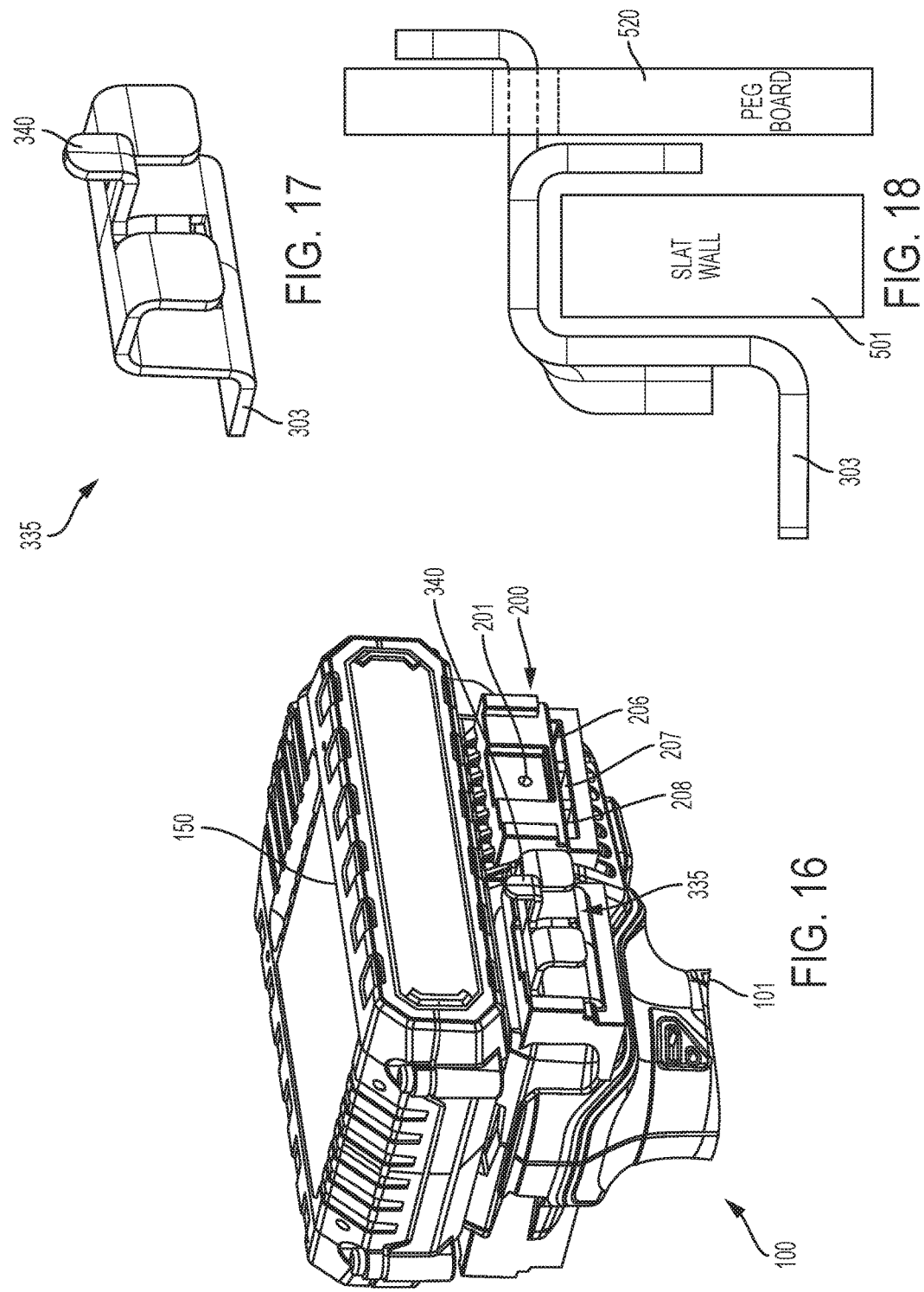

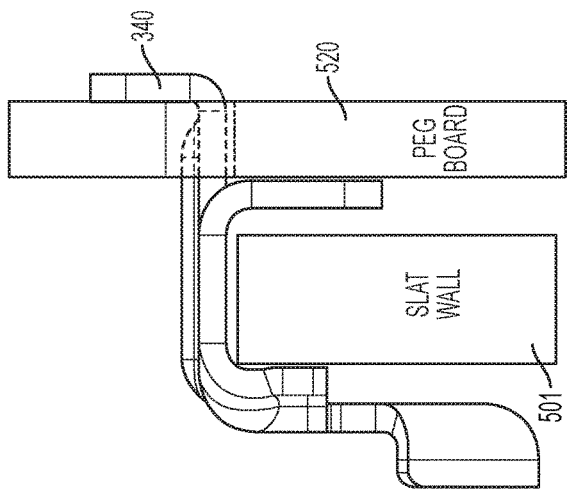
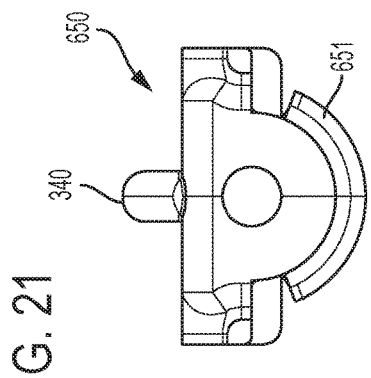
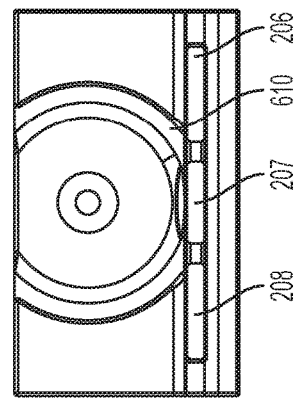
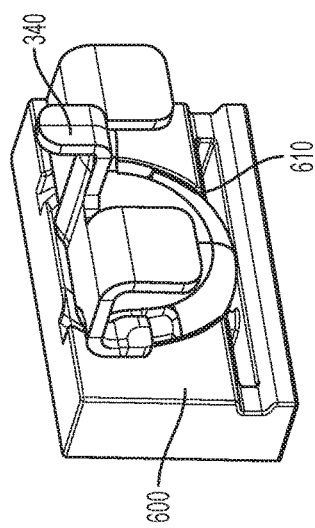
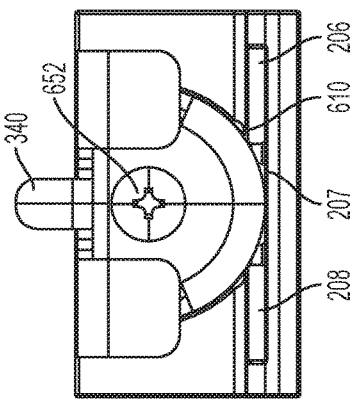
FIG. 21
FIG. 24
FIG. 23
FIG. 20
FIG. 22

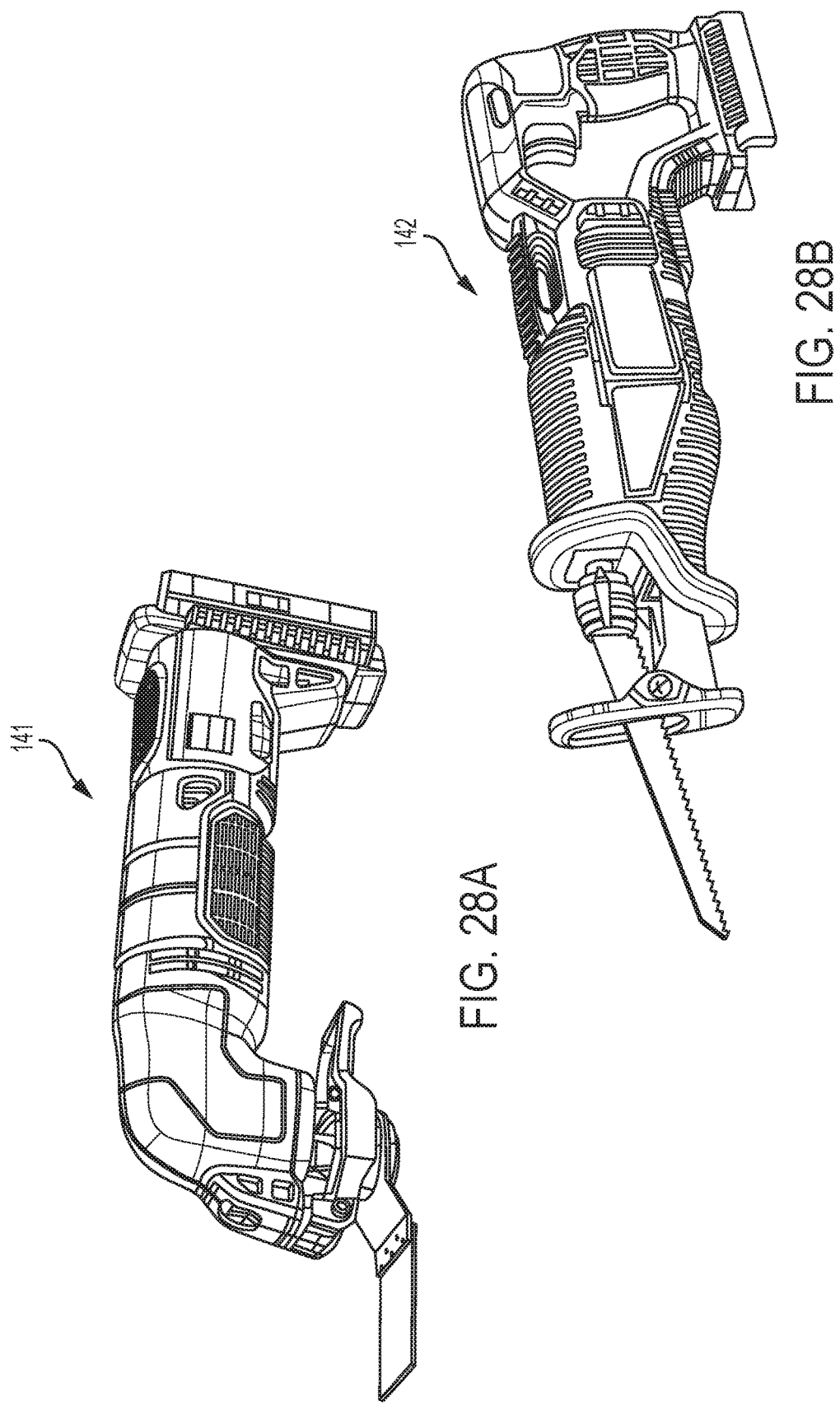

WALL HANGING SYSTEM

CROSS-REFERENCE TO RELATED APPLICATION

This application claims the benefit of U.S. Provisional Application No. 62/558,590 filed on Sep. 14, 2017, entitled Laser Level. The entire contents of U.S. Provisional Application No. 62/558,590 are incorporated herein by reference

FIELD OF THE INVENTION

The present application relates to a system for the hanging and storage of items, such as tools, on a wall.

BACKGROUND

It is desired to provide wall hanging system which effectively provides storage.

SUMMARY OF THE INVENTION

According to a first aspect, an exemplary embodiment of the invention has a tool hanging system including a first tool, the first tool having a first mount receiving portion; a first mounting attachment engaged with the first mount receiving portion; a second tool, the second tool having a second mount receiving portion; a second mounting attachment engaged with the second mount receiving portion; a wall panel. The first mounting attachment is configured to hang on the wall panel whereby the first tool is hung on the wall panel. The second mounting attachment is configured to hang on the wall panel whereby the second tool is hung on the wall panel.

The first tool may include a first motor.

The second tool may include a second motor.

The tool hanging system may further include a battery pack.

The battery pack may be selectively engageable with the first tool to provide power to the first motor.

The battery pack may be selectively engageable with the second tool to provide power to the second motor.

The first tool may be a drill.

The second tool may be a hedge trimmer.

The wall panel may include a hanging projection extending along a longitudinal axis of the wall panel.

The first mounting attachment may hang on the hanging projection.

The second mounting attachment may hang on the hanging projection.

The tool hanging system may further include a peg board including a plurality of peg board holes.

wherein the first mounting attachment includes a peg board projection which is selectively engageable with the plurality of peg board holes to secure the first tool to the peg board.

The first mount receiving portion may include at least one slot and at least one hole.

The at least one hole may be configured to receive a screw.

The first mount receiving portion may include at least two slots.

The at least two slots may be aligned along an axis.

The first mount receiving portion may include at least three slots.

The at least three slots may be aligned along an axis.

The first mount receiving portion may include at least one slot.

The first mounting attachment may include at least one slot projection which fits into the at least one slot.

The first mount receiving portion may include a receiving hole.

The first mounting attachment may include an attachment hole aligned with the receiving hole.

The tool hanging system may further include a fastener extending through the receiving hole and the attachment hole to secure the first mounting attachment to the first tool at the first mount receiving portion.

According to another aspect, there is an exemplary embodiment of a tool hanging system including a first powered tool, the first powered tool having a first mount receiving portion, the first mount receiving portion including first receiving slots; a first mounting attachment, the first mounting attachment including first mounting projections; a second powered tool, the second powered tool having a second mount receiving portion, the second mount receiving portion including second receiving slots; and a second mounting attachment, the second mounting attachment including second mounting projections. The first mount receiving portion is configured to selectively receive either the first mounting attachment or the second mounting attachment. The second mount receiving portion is configured to receive the second mounting attachment. The second mount receiving portion is configured such that the first mounting attachment is blocked from being engaged with the second mount receiving portion.

There may be a different number of first receiving slots than second receiving slots.

There may be are different number of first mounting projections than second mounting projections.

The first mounting attachment and the second mounting attachment may each include a groove and an overhang portion, configured to engage a hook portion of a slatwall.

BRIEF DESCRIPTION OF THE DRAWINGS

FIG. 3 is a close-up side view of the exemplary embodiment of the drill and battery pack with mount receiving portions;

FIG. 4A is a schematic view of an exemplary embodiment of a mount receiving portion;

FIG. 4B is a schematic view of an exemplary embodiment of a mounting attachment;

FIG. 5A is a schematic view of another exemplary embodiment of a mount receiving portion;

FIG. 5B is a schematic view of an exemplary embodiment of a mounting attachment FIG. 6A is a schematic view of another exemplary embodiment of a mount receiving portion;

FIG. 6B is a schematic view of an exemplary embodiment of a mounting attachment FIG. 7A is a schematic view of another exemplary embodiment of a mount receiving portion;

FIG. 7B is a schematic view of an exemplary embodiment of a mounting attachment FIG. 8A is a schematic view of another exemplary embodiment of a mount receiving portion;

FIG. 8B is a schematic view of an exemplary embodiment of a mounting attachment;

FIG. 9A is a perspective view of an exemplary embodiment of a mounting attachment in the form of a mounting hook;

FIG. 9B is a schematic view of the exemplary embodiment of the mounting attachment of FIG. 9A;

FIG. 10 is a perspective view of the mounting attachment of FIG. 9A connected to a mount receiving portion;

FIG. 11 is a side view of the exemplary embodiment of the mounting attachment hooked onto a slat wall;

FIG. 16 is a close-up side view of the exemplary embodiment of the drill and battery pack with mount receiving portions and a mounting attachment;

FIG. 17 is a perspective view of another exemplary embodiment of a mounting attachment;

FIG. 18 is a side view of the exemplary embodiment of the mounting attachment in FIG. 17 connected to a slatwall and peg board;

FIG. 20 illustrates another exemplary embodiment of a mounting attachment, in the form of a rotary attachment hook connected to a mount receiving portion;

FIG. 21 illustrates the exemplary embodiment of the rotary attachment hook engaged with a slatwall and peg board;

FIG. 22 illustrates the exemplary embodiment of the rotary attachment hook engaged with a rotary mount receiving portion;

FIG. 23 illustrates the exemplary embodiment of the rotary mount receiving portion;

FIG. 24 illustrates the exemplary embodiment of the rotary attachment hook;

FIG. 28A is a perspective view of an oscillating tool;

FIG. 28B is a perspective view of a reciprocating saw;

DETAILED DESCRIPTION OF EXEMPLARY EMBODIMENTS

An exemplary embodiment of a tool mounting assembly system is shown in FIGS. 1-30.

Figure 13:
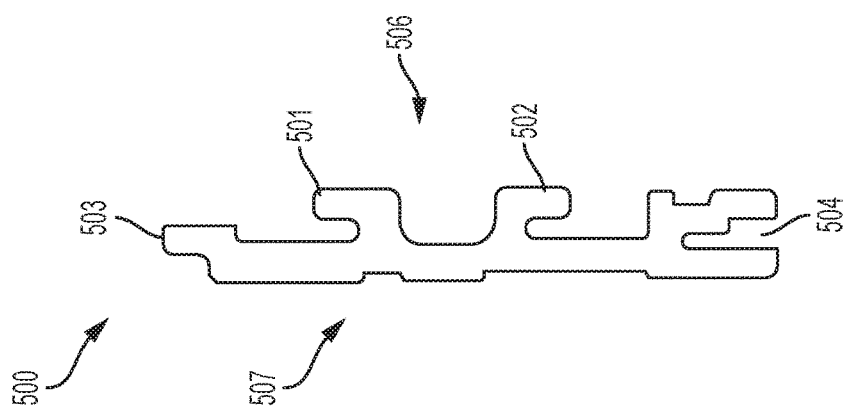
FIG. 13 is a side view of the exemplary embodiment of the slatwall.
Figure 12:
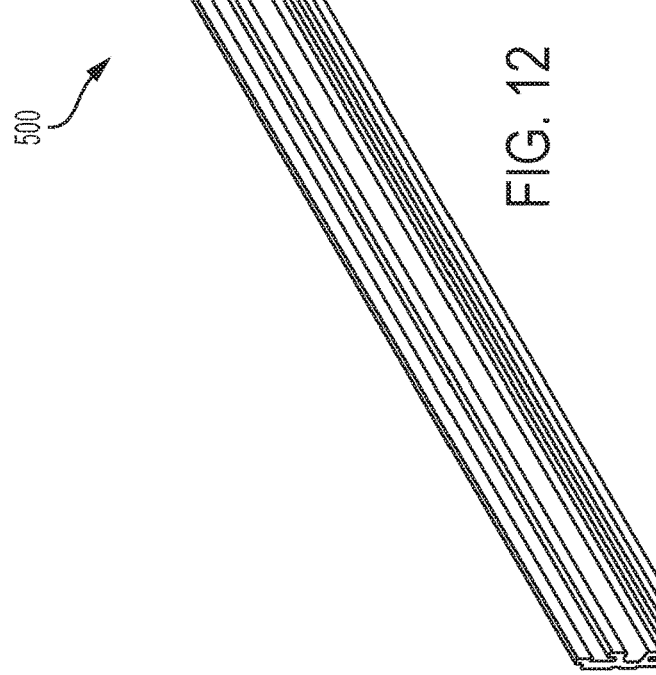
FIG. 12 is a perspective view of an exemplary embodiment of a slatwall.

A user may want to store various tools, for example, by hanging them on a wall. One way to store tools is by hanging them on a slatwall. An example of a slatwall 500 is shown in FIGS. 12 and 13. The slatwall 500 has the design of the slatwall shown in U.S. Pat. No. 8,528,871. U.S. Pat. No. 8,528,871 is hereby incorporated by reference in its entirety.

Figure 14:
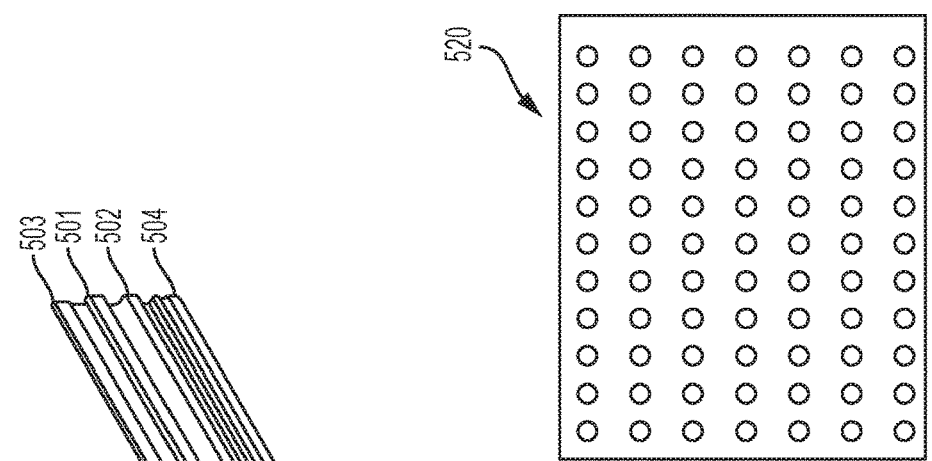
FIG. 14 is a front view of an exemplary embodiment of a peg board.

The slatwall 500 may be hung on the wall and tools can be hung on a hook of the slatwall 500, as will be discussed in greater detail below. It is also possible to hang items from a pegboard 520, an example of which is shown in FIG. 14. Pegboards are well known and consist of a board with a plurality of circular holes. The exemplary embodiment of the present application includes hanging tools on pegboard 520 as well.

The present exemplary embodiment of a tool mounting assembly system provides a system of mounting receiving portions on tools which receive various mounting attachment hooks. The mounting receiving portions receive one or more of a variety of mounting attachments/hook. The mounting attachments then engage with the hook of the slatwall 500 or in a hole of the pegboard 520.

Figure 1:
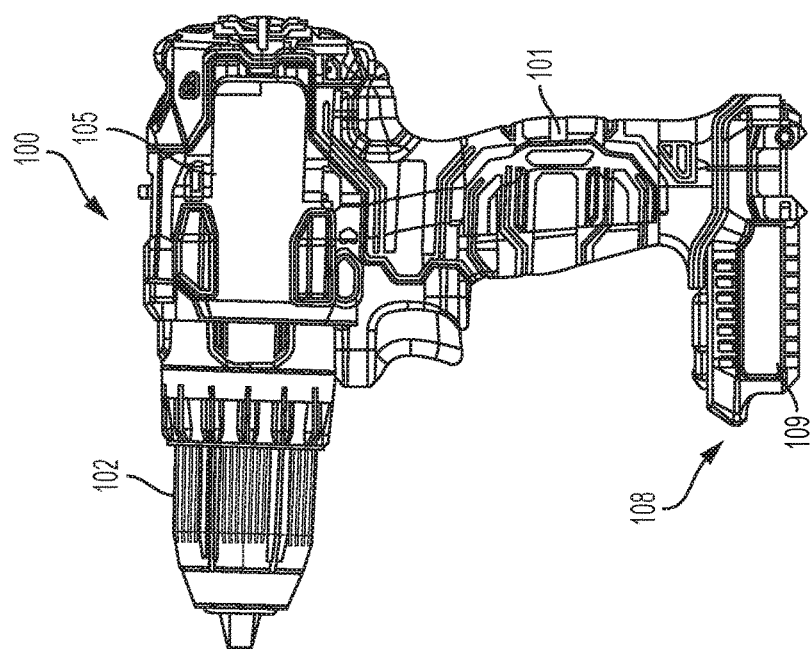
FIG. 1 is a side view of an exemplary embodiment of a drill to which an exemplary embodiment of a wall hanging system may be employed.

FIG. 1 illustrates a power tool in the form of a portable powered drill 100. The drill 100 includes a handle 101 and a chuck 102 for holding a drill bit. A motor 105 is interior to the housing. At a distal end of the handle 101 is a battery receiving portion 108. The battery receiving portion 108 receives a battery pack 150 (FIGS. 3 and 16). The battery pack 150 provides power to the motor 105 which turns the chuck 102 to operate the drill 100. The battery receiving portion 108 has two sides 109. In the exemplary embodiment, one or both of the sides 109 provide a space for mounting receiving portions.

Figure 2:
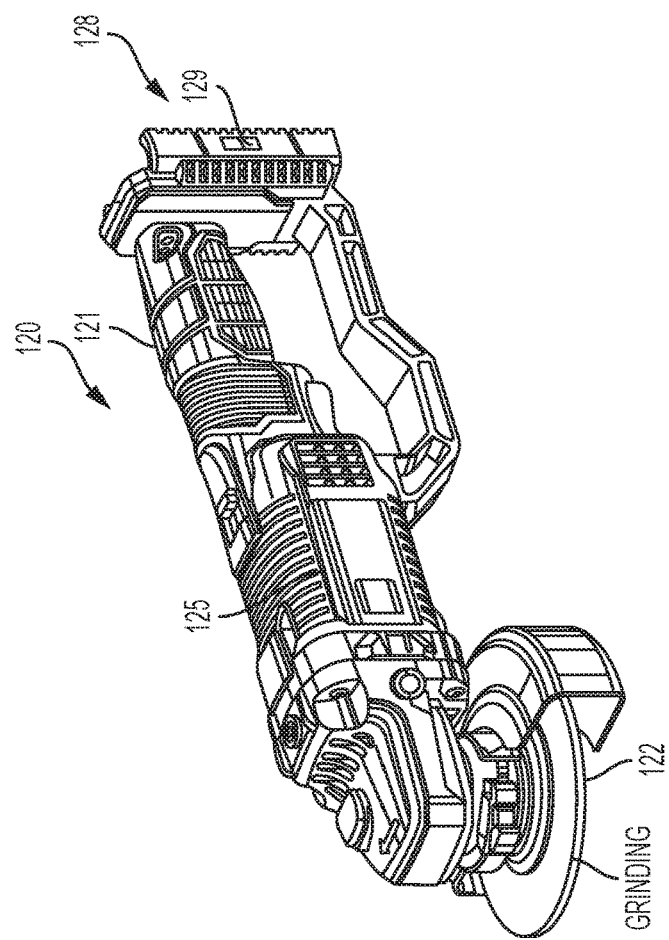
FIG. 2 is a side view of an exemplary embodiment of an grinder to which an exemplary embodiment of a wall hanging system may be employed.

FIG. 2 illustrates another power tool, in this case, a grinder 120. The grinder includes a handle 121 and a motor 125 housed in the grinder 120 housing. The motor 125 rotates a grinding wheel 122 attached to an output of the grinder 120. The grinder 120 includes a battery receiving portion 128 which is similar to the battery receiving portion 108. The battery receiving portion 128 receives battery pack 150 (FIGS. 3 and 16). This is the same battery pack 150 that can power the drill 100. The battery receiving portion 128 includes sides 129 on which mounting receiving portions may be formed.

FIG. 3 illustrates a close-up of the battery receiving portion 108. As shown in FIG. 3, the battery receiving portion 108 receives battery pack 150. Additionally, it includes two mount receiving portions 200. The mount receiving portions 200 include one hole 201. The hole 201 is threaded so that it can receive a threaded fastener, such as a screw. In other embodiments, the hole may not be threaded. The mount receiving portions 200 also include three slots 205. The slots 205 comprise a forward slot 206, middle slot 207 and rearward slot 208. The slots 206, 207 and 208 are all the same size and are aligned with one another along a common axis. The mount receiving portion 200 is also shown schematically in FIG. 4A.

The mount receiving portion 200 may receive a mounting accessory including complementary attachment features. For example, the mount receiving portion 200 may receive the mounting hook 300 shown in FIGS. 9A and 9B. FIG. 9A is a perspective view of the mounting hook 300 and FIG. 9B is a rear plan view of the hook 300. The mounting hook 300 includes a mounting hole 301, a first mounting projection 302 and a second mounting projection 303. The first mounting projection 302 first into the forward slot 206 and the second mounting projection 303 fits into the rearward slot 208. The mounting hole 301 aligns with the hole 201. In order to attach the mounting hook 300 to the tool at the mount receiving portion 200, the mounting projections 302, 303 are slid into the slots 206, 208 and a screw is fastened through the holes 201, 301. In this manner, the mounting hook 300 is attached at the mount receiving portion.

As shown in FIGS. 9-11, the mounting hook 300 includes a groove 310 and an overhang portion 311. The groove 310 is designed to fit over a hook portion of a slatwall, such as the slatwall 500, as shown in FIG. 11. As additionally shown in FIG. 11, the overhang 311 overhangs an opposite side of the slatwall hook portion to secure the mounting hook 300 thereto.

The mounting hook 300 is shown in FIG. 10 in a position where it is attached to the mount receiving portion of a tool. The particulars of the tool are not shown. As will be appreciated, if attached to the drill 100 shown in FIG. 3, the drill 100 would hang upside down.

The mount receiving portion 200 includes three slots 205, though the mounting hook 300 includes only two mounting projections 302, 303. The mount receiving portions 200 could also accept a mounting attachment which includes three mounting projections, one fitting into each of the three slots 205 of the mount receiving portion 200.

FIGS. 4-8 illustrate various possible configurations for mount receiving portions. FIG. 4A illustrates mount receiving portion 200, which is discussed above. FIG. 5A illustrates a second mount receiving portion 250. The second mount receiving portion 250 includes a hole 201, forward slot 206 and rearward slot 208, like the mount receiving portion 200. The second mount receiving portion 250 additionally includes an off-center slot 211. The off-center slot 211 is between the forward slot 206 and the rearward slot 208, but is not centered between them. Rather, it is skewed closer to the rearward slot 208. The off-center slot 211 is also smaller than the slots 206 and 208.

A third mount receiving portion 251 is shown in FIG. 6A. The third mount receiving portion 251 includes slots 206, 208 as well as hole 201, but lacks any middle or central slot. FIG. 7A illustrates a fourth mount receiving portion 252. The fourth mount receiving portion 252 again includes hole 201. It also includes forward slot 206. However, unlike the previous mount receiving portions, it includes an elongated rearward slot 218. The elongated rearward slot 218 is larger than the forward slot 206 and the previously described rearward slots 208.

FIG. 8A illustrates a fifth mount receiving portion 253. The fifth mount receiving portion 253 includes hole 201 and forward slot 206. Additionally, it includes an extended elongated rearward slot 219. The extended elongated rearward slot 219 is longer than the extended rearward slot 218 of the fourth mount receiving portion 252 shown in FIG. 7A.

The various mount receiving portions 200, 250, 251, 252, 253 may be applied to any number of tools. For example, one or more may be included on the drill 100 or grinder 120. They may also be applied to the oscillating tool 141 shown in FIG. 28A or the reciprocating saw 142 shown in FIG. 28B. It may be formed at a battery receiving portion or at another portion of the power tools. Additionally, they may be formed on the housing of outdoor power tools such as a string trimmer, hedge trimmer or blower.

The various mount receiving portions may be formed in different combinations on the various tools. For example, mount receiving portion 200 and second mount receiving portion 250 may be formed on one side 109 of the battery receiving portion 108 of the drill 100 and mount receiving portions 250 and 251 may be formed on the other side 109 of the battery receiving portion of the drill 100.

As can be appreciated, the various mount receiving portions 200, 250, 251, 252, 253 can receive various different mount attachments. In some instances, a mount attachment may be mountable into all five of various of the different receiving portions. In other instances, a mount attachment may be only mountable on a single type of receiving portion. Some mount attachments may be mountable on more than one type of receiving portion, but not all of the receiving portions.

The mount attachment hook 300, discussed above, includes mount projections 302 and 303. These mount projections 302, 303 correspond to the mounting holes 206, 208, shown in FIG. 6A. That is, the mount projections 302, 303 correspond to the size of the mounting holes 206, 208 so that they can fit therein. Accordingly, the mount attachment hook 300 may be mounted onto the third mount receiving portion 251 shown in FIG. 6A. In particular, the mount projection 302 would engage with the slot 206 and the mount projection 303 would engage the slot 208. Additionally, the hole 201 would align with the hole 301.

The mount attachment hook 300 is also mountable with a number of the other mount receiving portions. As discussed above, the mount attachment hook 300 is engageable with the mount receiving portion 200 shown in FIGS. 3 and 4A. In this instance, the mount projections 302, 303 engage with the slots 206, 208 and the slot 207 simply remains empty. Similarly, the mount attachment hook 300 is mountable on the second mount receiving portion 250, the fourth mount receiving portion 252 and the fifth mount receiving portion 523. In the case of the second mount receiving portion 250, again the projections 302, 303 can fit into the slots 206, 208. Slot 211 remains empty.

In the fourth mount receiving portion 252 and the fifth mount receiving portion 253, the projection 302 fits into the slot 206. The projection 303 fits into the elongated slots. Specifically, in the fourth mount receiving portion, the projection 303 engages elongated slot 218. Although the elongated slot 218 is much larger than the projection 303 and does not correspond in size in a lengthwise direction, a longer slot is able to receive a smaller projection. Similarly, the projection 303 can fit into the extended elongated slot 219 of the fifth mounting projection 253. Again, the extended elongated slot 219 has a much greater length than the projection 303, but is able to accept the smaller projection 303.

As shown with the above, the mounting hook 300 may be mounted onto any of the mounting projection portions 200, 250, 251, 252, 253.

FIGS. 4B, 5B, 6B, 7B and 8B are plan views of mounting attachments, similar to FIG. 9B. The mounting attachments shown in FIGS. 4B, 5B, 6B, 7B and 8B include groove and overhang portions, such as those shown in FIG. 11. They may also include other features, such as peg board mounting projections or other types of hooks. The mounting projections shown in FIGS. 4B, 5B, 6B, 7B and 8B project the same as the mounting projection 303 shown in FIG. 11 so that they can engage in slots of a mount receiving portion.

The second mounting attachment hook 330 is shown in FIG. 4B. It includes the mounting projections 302 and 303, similar to the mounting hook 300. However, the second mounting attachment hook 330 also includes a central mounting projection 307. As will be appreciated, the central mounting projection 307 prevents the second mounting attachment hook 330 from being attached to some of the previously discussed mount receiving portions. For example, the second mounting attachment hook 330 can be mounted to the mount receiving portion 200 shown in FIG. 4A. The central mounting projection 307 fits into the mounting hole 207. The hole 301 is aligned with hole 201 and a fastener, such as a screw, can be threaded therethrough. However, the second mounting attachment hook 330 cannot be mounted on the second mounting receiving portion 250, the third mounting receiving portion 251, or the fourth mounting receiving portion 252.

With reference to the second mounting receiving portion 250 shown in FIG. 5A, the central mounting projection 207 is larger than the receiving slot 211 and is not aligned with the slot. Accordingly, it cannot be received in the slot 211 and blocks the second mounting attachment hook 330 from being mounted to the second mounting receiving portion 250. In the case of the third mounting receiving portion 251, shown in FIG. 6A, the receiving potion 251 simply lacks any corresponding slot for the central mounting projection 307 shown in FIG. 4B. Accordingly, the second mounting attachment projection 330 of FIG. 4B is blocked from being mounted on the third mount receiving portion 251 shown in FIG. 6A.

Third mounting attachment hook 331 is shown in FIG. 5B. It includes mounting projections configured to align and correspond to the second mount receiving portion 250, shown in FIG. 5A. The third mounting attachment hook 331 includes previously discussed projections 302 and 303. It also includes an off-center mounting projection 321 that is corresponds in size and location to the slot 211 so that it can fit and be held therein. The third mounting attachment hook 331 may also be attached to the mounting attachment portions 200, 252 and 253. However, it is blocked from being attached to the third mounting attachment portion 251 because that mounting attachment portion lacks any slot for the off-center mounting projection 321.

FIG. 7B illustrates a fourth mounting attachment hook 332. It includes mounting projection 302 as well as an elongated mounting projection 318. The extended mounting projection 318 corresponds in size and location to the slot 218 of the fourth mount receiving portion 252 shown in FIG. 7A, so that it can fit and be held therein. As will be appreciated, the fourth mounting attachment hook 332 can also be mounted to the fifth mount attachment portion 253, shown in FIG. 8A (in addition to the fourth mount receiving portion 252 of FIG. 7A), but would be blocked from being mounted with the other mount receiving portions.

FIG. 8B illustrates a fifth mounting attachment hook 333. It includes mounting projection 302 as well as an extended elongated mounting projection 319. The extended mounting projection 319 corresponds in size and location to the slot 219 of the fifth mount receiving portion 253 shown in FIG. 7A, so that it can fit and be held therein. Accordingly, the fifth mounting attachment hook 333 can be mounted to the fifth mount receiving portion 253 shown in FIG. 7A. As will be appreciated, the fifth mounting attachment hook 333 is blocked mounted to any of the other mounting receiving portions previously described.

A slatwall 500 is shown in FIGS. 12 and 13. The slatwall 500 has an upper hook 501 which runs along a length of the slatwall 500. It also includes a lower hook 502 which runs along a length of the slatwall 500. The hooks 501 and 502 are at a front side 506 of the slatwall and the opposite side is a rear side 507. The rear side 507 of the slatwall 500 can be placed against a wall and affixed thereto, for example, by screwing the slatwall 500 into the wall of a room, such as a garage or a shed. The slatwall 500 has a connection projection 503 and a connecting receiver 504. The connecting projection 503 is sized to fit into the connecting receiver 504 of an identical slatwall so that multiple slatwalls 500 can be connected together. That is two or more slatwalls may be connected one on top of another with the projection 503 from one slatwall engaged with the receiver 504 of an adjacent slatwall 500. The connecting receiver 504 may also receive a pegboard, such as pegboard 520 so that it may be included in they assembly.

As shown in FIG. 11, attachment hook 300 may fit over a hook 501 of the slatwall 500. This secures the attachment hook 300 on the slatwall 500. Although not shown in the views of FIGS. 4B, 5B, 7B and 8B, the other attachment hooks also include groove portions 310 and overhangs 311 so that they likewise may fit over hook 501 and be held on the slatwall 500. That is, hooks 330, 331, 332 and 333 may all be hung on the slatwall 500 in the same manner as hook 300. As explained above, the hooks 300, 330, 331, 332 and 333 may be mounted to various tools, such as power tools, outdoor power tool, hand tools or garden equipment if those tools include the appropriate mounting portions.

Figure 15:
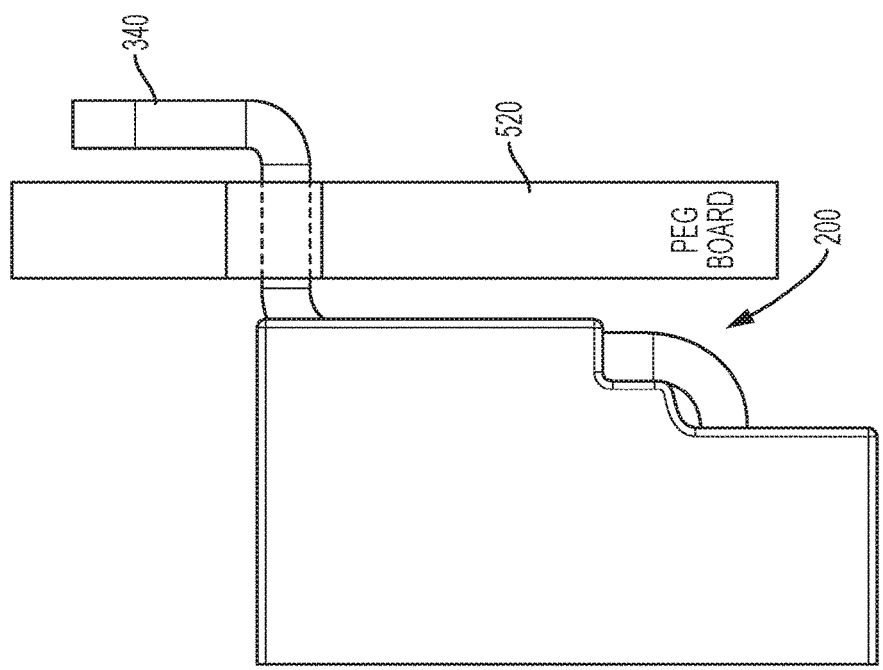
FIG. 15 is a side view of an exemplary embodiment of a mounting attachment on a mount receiving portion connected to a peg board.

FIG. 17 shows another mounting hook 335. The mounting hook 335 has the same three mounting projections 302, 303, 307, as the hook 330, shown in FIG. 4B. However, the peg board mounting hook 335 additionally includes a peg board projection 340. The peg board projection 340 allows the mounting hook 335 to be attached to one or both of the peg board 520, as is shown in FIG. 15. The mounting hook 335 is also still attachable to the slatwall 500 or both the slatwall 500 and pegboard 520, as is shown in FIG. 18. The mounting hook 335 including a peg board projection 340 allows a tool with the mounting hook 335 attached to be hung on a peg board, in addition to the slatwall. FIG. 16 shows the hook 335 attached to a drill 100. Any of the hook configurations 300, 330, 331, 332 and 333 may be modified to include the peg board projection 340 of the hook 335 shown in FIGS. 15-18. That is, for example, hook 331 may be made with the mounting projections 302, 303, 321 shown in FIG. 5B and either the hook configuration of FIGS. 9A and 11 or the instead of the hook configuration with peg board projection 340 shown in FIGS. 17 and 18. This is true for all of the hooks 300, 330, 331, 332 and 333.

Figure 19:
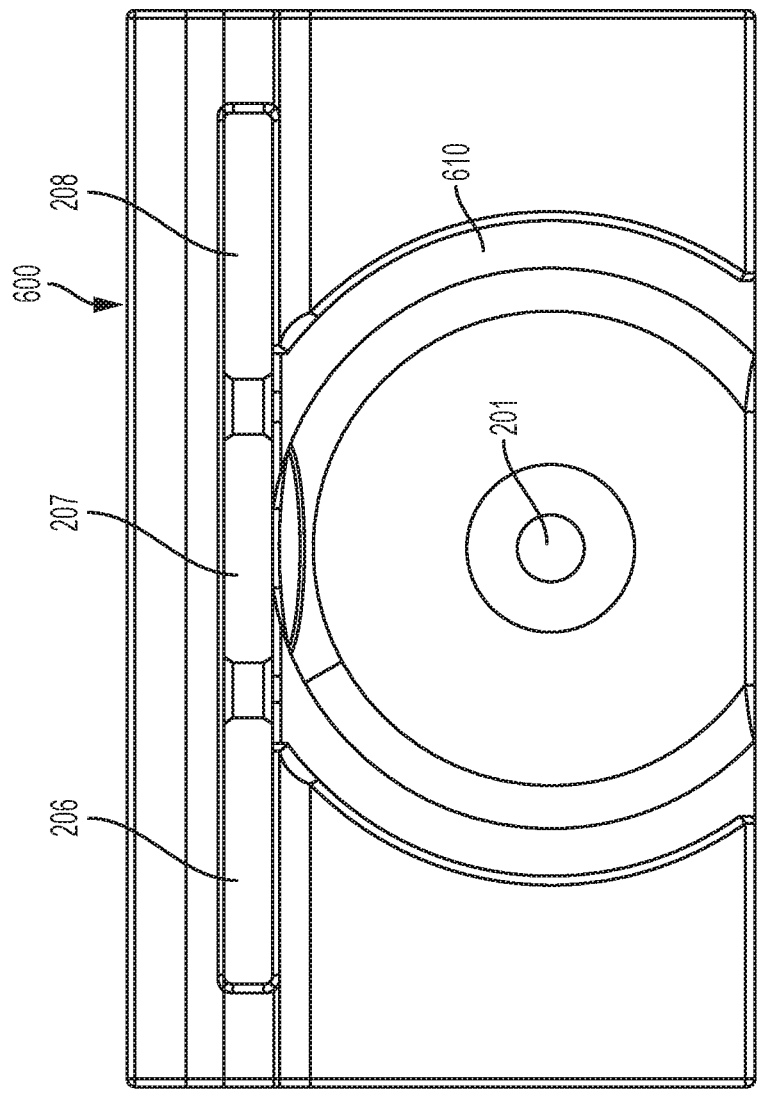
FIG. 19 is a side view an exemplary embodiment of a rotary mount receiving portion.

FIG. 19 illustrates a rotary mount receiving portion 600. The rotary mount receiving portion 611 may be formed in a variety of tools, as with the previously described mount receiving portions. For example, it may be formed on a drill, string trimmer, blower, garden tool or the like. The rotary mount receiving portion 600 includes the three slots 206, 207 and 208, the same as the mount receiving portion 200, shown in FIG. 4A. It also includes a hole 201. These features allow the rotary mount receiving portion 600 to receive some of the hooks described above, as will be appreciated.

In addition to those features, the rotary mount receiving portion 600 includes a groove 610, as best seen in FIG. 23. The groove 610 allows for some rotation of a hook. A rotatable attachment hook 650 is shown in FIG. 24. As shown in FIG. 21, it is attachable to a slat wall 500 and a peg board 520. The projection 340 and hook features allowing for it to be hung are the same as for hook 335 shown in FIG. 17. The rotatable attachment hook 650 includes a projection 651 which fits into the groove 610 and is rotatable within the groove. The rotatable attachment hook 650 can be screwed onto the rotary mount receiving portion 600 and the hook 650 can rotate within the groove so that the tool to which it is attached may rotate. Thus, this receiving portion and hook combination provides for rotatable hanging. The rotation may be 30 degrees or less; 40 degree or less; 50 degrees or less; 60 degrees or less; 90 degrees or less; or 180 degrees or less. In some embodiments the groove could be extended 360 degrees to allow for full 360 degree rotation.

It is also noted that the groove 610 could be added to any of the slot configurations previously discussed with respect to FIGS. 4-8.

Figure 27:
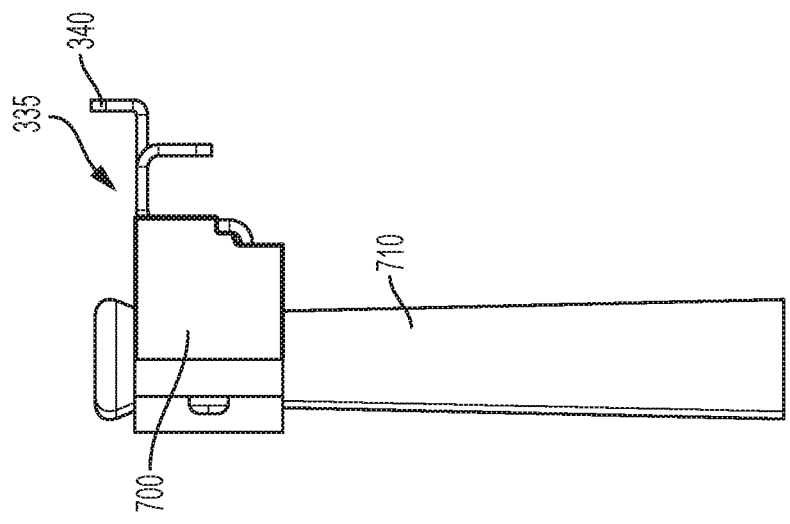
FIG. 27 is a side view of the exemplary embodiment of the accessory adaptor attached to the cord.
Figure 26:
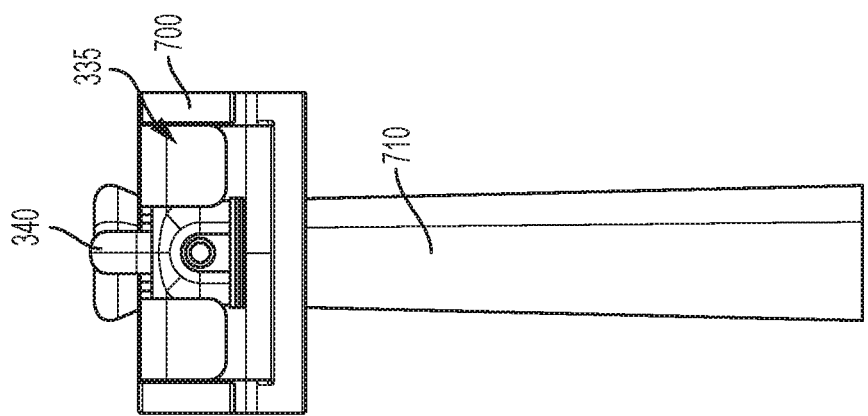
FIG. 26 is a front view of the exemplary embodiment of the accessory adaptor attached to the cord.
Figure 25:
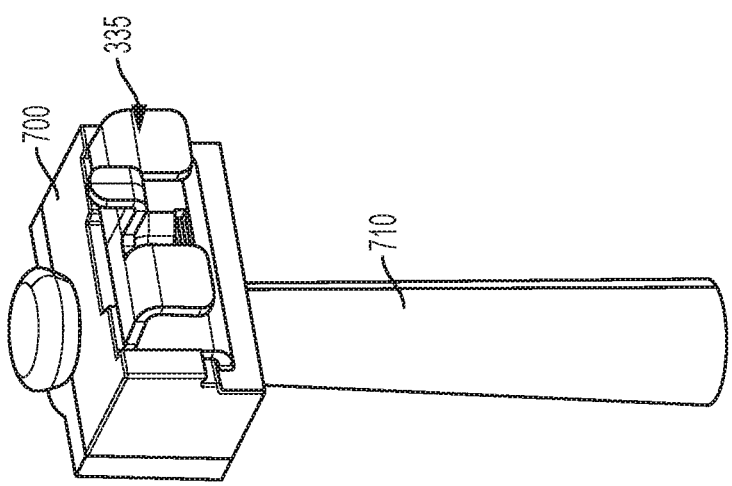
FIG. 25 is a perspective view of an exemplary embodiment of a accessory adaptor attached to a cord.

In some instances, it may be desirable to includes a mounting receiving portion on a cord rather than on the housing of a tool FIGS. 25-27 illustrate cords with accessory adapters 700. The accessory adaptors 700 surround and are attached to the cord. The accessory adaptors 700 include one of the various mounting attachment portions discussed above so that one of the mounting hooks discussed above can be affixed thereto. In this case, the mounting hook 335 is mounted to the accessory adaptor 700. It is attached to an appropriate mounting portion configuration and screwed into place. In this way, a corded tool may also be fitted with one of the hooks of the present application.

Figure 30:
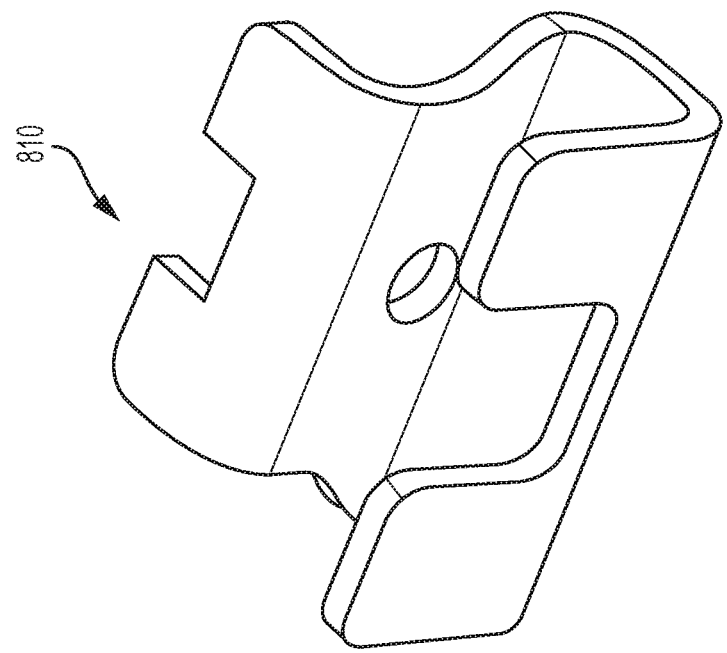
FIG. 30 is a perspective view of an exemplary embodiment of a heavy duty hook.
Figure 29:
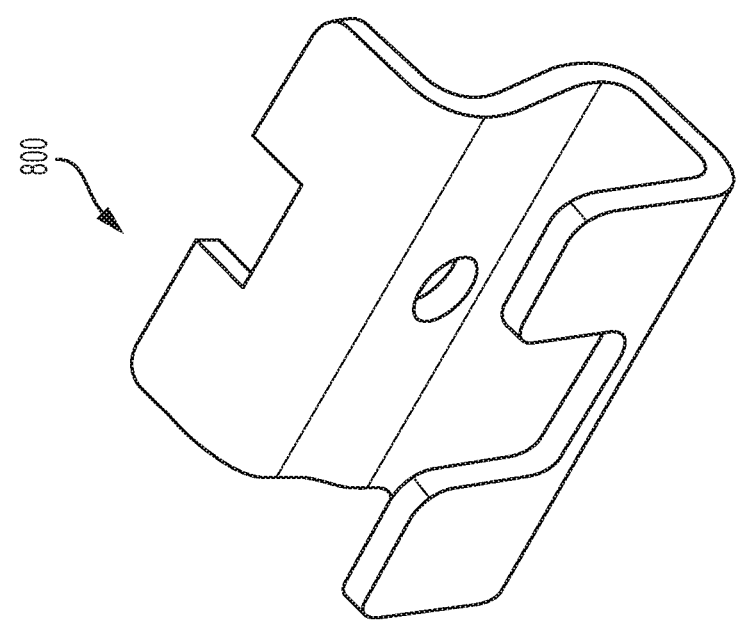
FIG. 29 is a perspective of an exemplary embodiment of a light duty hook.

A variety of different types of hooks are envisioned. As discussed specifically above, some hooks may include a peg board projection for hanging on a peg board and other hooks may only have an overhang for hanging on a slatwall 500 and lack a peg board projection. Additionally, FIGS. 29 and 30 illustrate light and heavy duty hooks. FIG. 29 illustrates a light duty hook 800 and FIG. 30 illustrates a heavy duty hook 810. The heavy duty hook 810 may be made thicker, bigger or of a different material so that it can support a larger load. For example, the heavy duty hook 810 may be able to support a load 20% greater than the light duty hook 800; 40% greater than the light duty hook 800; 50% greater than the light duty hook; 80% greater than the light duty hook 800 or 100% greater than the light duty hook 800.

The light duty hook and the heavy duty hooks may include mounting projections according to any of the designs shown in FIGS. 4B, 5B, 6B, 7B and 8B. They may also be modified to include the rotary projection 651 and/or the peg board projection 340.

As discussed above, the present application contemplates that a variety of tools may be made to include mount receiving portions which may receive a variety of mounting hooks. The mount receiving portions may include different varieties of slots and grooves so that they can receive mounting hooks with a different variety of mounting projections, holes and groove projections. Finally, the hooks may be made differently by having different types of hooks, such as those designed to hang on a slatwall, designed to hang on a peg board, being heavy duty or being light duty.

According to this system, a tool system may be designed such that different tools are able to receive different hooks. For example, drill 100 may be formed with mount receiving portion 200 shown in FIG. 4A and a string trimmer may be formed with the fourth mount receiving portion 252 shown in FIG. 7A. Additionally, the light duty hook 800 shown in FIG. 29 may be made with the mounting projection configuration 330 shown in FIG. 4B and the heavy duty hook 810 shown in FIG. 30 may be made with the mounting projection configuration 332 shown in FIG. 7B. In that instance, the drill could receive the light duty hook, but could not receive the heavy duty hook. In contrast, the string trimmer could receive the heavy duty hook, but not the light duty hook. As will be appreciated, various combinations are possible. For example, the string trimmer could instead include the mount receiving portion 253 of FIG. 8, in which it could receive either the light duty hook or the heavy duty hook, in this example (light duty hook 800 shown in FIG. 29 made with the mounting projection configuration 330 shown in FIG. 4B and the heavy duty hook 810 shown in FIG. 30 made with the mounting projection configuration 332 shown in FIG. 7B).

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A tool hanging system, comprising:
    a first tool, the first tool having a first mount receiving portion;
    a first mounting attachment engaged with the first mount receiving portion;
    a second tool, the second tool having a second mount receiving portion;
    a second mounting attachment engaged with the second mount receiving portion;
    a wall panel;
    wherein the first mounting attachment is configured to hang on the wall panel whereby the first tool is hung on the wall panel;
    wherein the second mounting attachment is configured to hang on the wall panel whereby the second tool is hung on the wall panel;
    wherein the first tool comprises a first motor;
    wherein the second tool comprises a second motor;
    wherein the tool hanging system further comprises a battery pack;
    wherein the battery pack is selectively engageable with the first tool to provide power to the first motor; and
    wherein the battery pack is selectively engageable with the second tool to provide power to the second motor;
    wherein the first mount receiving portion has a different configuration than the second mount receiving portion such that the first mounting attachment is blocked from engagement with the second mount receiving portion;
    wherein the first mounting attachment and the second mounting attachment each include a groove and an overhang portion;
    wherein the wall panel includes a hanging projection extending along a longitudinal axis of the wall panel;
    wherein the first mounting attachment hangs on the hanging projection; and
    wherein the second mounting attachment hangs on the hanging projection.

2. The tool hanging system of claim 1, wherein the first tool is a drill; and
    wherein the second tool is a hedge trimmer.

3. The tool hanging system of claim 1, wherein the first mount receiving portion comprises at least one slot and at least one hole.

4. The tool hanging system of claim 3, wherein the at least one hole is configured to receive a screw.

5. The tool hanging system of claim 3, wherein the first mount receiving portion comprises at least two slots.

6. The tool hanging system of claim 5, wherein the at least two slots are aligned along an axis.

7. The tool hanging system of claim 1, wherein the first mount receiving portion comprises at least three slots.

8. The tool hanging system of claim 7, wherein the at least three slots are aligned along an axis.

9. The tool hanging system of claim 1, wherein the first mount receiving portion comprises at least one slot.

10. The tool hanging system of claim 9, wherein the first mounting attachment includes at least one slot projection which fits into the at least one slot.

11. The tool hanging system of claim 1, wherein the first mount receiving portion comprises a receiving hole.

12. The tool hanging system of claim 11, wherein the first mounting attachment includes an attachment hole aligned with the receiving hole.

13. The tool hanging system of claim 12, further comprising a fastener extending through the receiving hole and the attachment hole to secure the first mounting attachment to the first tool at the first mount receiving portion.

14. A tool hanging system, comprising:
- a first powered tool, the first powered tool having a first mount receiving portion, the first mount receiving portion including first receiving slots;
- a first mounting attachment, the first mounting attachment including first mounting projections;
- a second powered tool, the second powered tool having a second mount receiving portion, the second mount receiving portion including second receiving slots;
- a second mounting attachment, the second mounting attachment including second mounting projections;
- wherein the first mount receiving portion is configured to selectively receive either the first mounting attachment or the second mounting attachment; and
- wherein the second mount receiving portion is configured to receive the second mounting attachment; and
- wherein the second mount receiving portion is configured such that the first mounting attachment is blocked from being engaged with the second mount receiving portion.

15. The tool hanging system of claim 14, wherein there are a different number of first receiving slots than second receiving slots.

16. The tool hanging system of claim 14, wherein there are different number of first mounting projections than second mounting projections.

17. The tool hanging system of claim 14, wherein the first mounting attachment and the second mounting attachment each include a groove and an overhang portion, configured to engage a hook portion of a slatwall.

* * * * *